United States Patent [19]

Dubois et al.

[11] 4,272,589
[45] Jun. 9, 1981

[54] PROCESS FOR GLUING TWO MEMBERS USING A PHOTOPOLYMERIZABLE SUBSTANCE

[75] Inventors: Jean-Claude Dubois; Armand Eranian; Paul Paimblant, all of Paris, France

[73] Assignee: Thomson-CSF, Paris, France

[21] Appl. No.: 102,901

[22] Filed: Dec. 12, 1979

[30] Foreign Application Priority Data

Dec. 15, 1978 [FR] France .............................. 78 35385

[51] Int. Cl.³ ...................... B32B 17/10; B29C 19/02
[52] U.S. Cl. ................................... 428/442; 156/99; 156/272; 156/314; 156/332; 204/159.16; 204/159.23; 428/419; 428/520; 525/286; 528/380
[58] Field of Search ................. 156/99, 314, 272, 332; 428/419, 520, 442; 204/159.16, 159.23; 528/380; 525/286

[56] References Cited

U.S. PATENT DOCUMENTS

| | | | |
|---|---|---|---|
| 2,367,670 | 1/1945 | Christ | 156/272 |
| 3,331,761 | 7/1967 | Mao | 204/159.23 |
| 3,404,158 | 10/1968 | Yu | 528/380 |
| 3,551,246 | 12/1970 | Bassemir et al. | 156/272 |
| 3,840,448 | 10/1974 | Osborn et al. | 204/159.23 |
| 3,867,222 | 2/1975 | Plant et al. | 156/272 |
| 4,018,333 | 4/1977 | Blackwood | 156/272 |

FOREIGN PATENT DOCUMENTS 655540  1/1963  Canada .................................. 156/99

Primary Examiner—John J. Gallagher
Attorney, Agent, or Firm—Cushman, Darby & Cushman

[57] ABSTRACT

Two members, at least one member being permeable to ultraviolet radiation are glued together by means of a photopolymerizable substance deposited in layer form on and exposed to radiation through the permeable member. This substance comprises various vinyl monomers, soluble reactive polymers and a photosensitive catalyst, whereby at least one of the monomers or reactive polymers has a thi-irane cycle as part of its structure.

15 Claims, 1 Drawing Figure

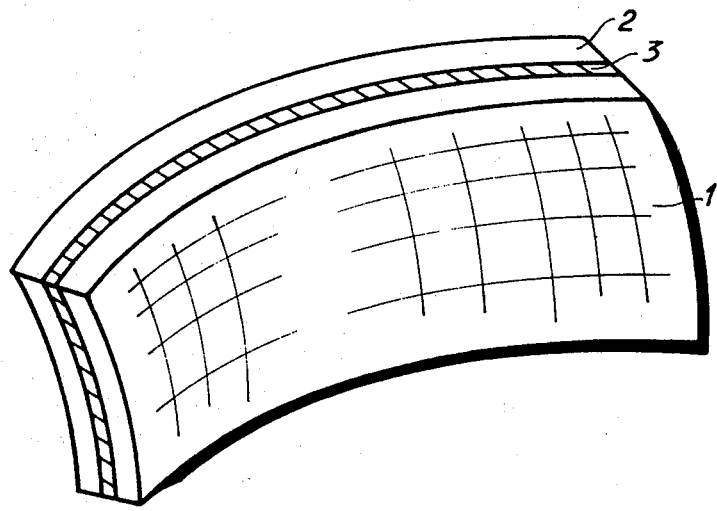

PROCESS FOR GLUING TWO MEMBERS USING A PHOTOPOLYMERIZABLE SUBSTANCE

BACKGROUND OF THE INVENTION

The present invention relates to a process for welding or securing together two members, at least one of which is permeable to ultraviolet radiation to which it is exposed and in particular sheets made from glass and plastics material.

In numerous industrial constructions, transparent devices having a laminated structure are used, which offer a high resistance to thermal, mechanical and other shocks. Such devices comprise two transparent sheets, which are joined by means of a glue. One surface of one of the sheets is covered with a product containing a solvent and then the other sheet is applied. By eliminating the solvent through evaporation, appropriate heating permits the hardening or setting of the product. One type of product which is more particularly used is a solution composed of polyvinylbutyral, a plasticizer (such as diethyl-triglycol acetate in a proportion of 30%) and a solvent (such as an aliphatic alcohol or an ester). Such a composition is more particularly used in laminated glass windshields in which two sheets of glass having the desired shape are joined together by such a glue and in certain shields and casings in which a glass sheet and a plastic sheet are joined together. Gluing processes using this type of glue require an energy source that provide heating for a relatively long period of time. Furthermore, it is difficult for hardening to be perfect over the entire surface area of the support and traces of solvent can be left behind, which is detrimental to the strength, because the glue is not sufficiently hardened. In the case where plastic sheets are used, these solvent residues attack the plastic and the strength thereof is then further reduced.

BRIEF SUMMARY OF THE INVENTION

The present invention aims at obviating these disadvantages and therefore relates to a gluing process using a photopolymerisable composition which is sufficiently fluid to permit its spreading on one surface of one of the supports, but which contains no solvent and is able to rapidly and completely harden under the action of ultraviolet radiation. Polymerisation makes the composition very hard and adheres perfectly to the two joined surfaces. It comprises a mixture of monomers and reactive polymers which are soluble in monomers, while the chemical formula of at least one of the components contains a thi-irane cycle. This process obviates the problem of eliminating the solvent and the disadvantages resulting therefrom. The use of a glue that becomes hardened by means of radiation requires that one of the two members to be joined together be permeable to a portion of the applied radiation, which is the case in the two applications referred to hereinbefore. Illumination can take place through one or the other or both of the two members and no special environmental conditions exist. A considerable energy saving is achieved because long heating is eliminated and the requisite energy used is that of a medium power ultraviolet source operating for a few seconds to a few minutes. As there is no solvent, there is no problem of the solvent chemically attacking the plastic sheet in the case of a plastic-plastic or plastic-glass laminate. In the case where the members to be joined together are not of the same type, for the purpose of increasing adhesion, the invention provides for the application of a coating whose nature makes it compatible both with the photopolymerisable composition and whichever of the two facing surfaces is less adhesive to one of the two sheets prior to the deposition of the photopolymerisable composition.

The present invention relates to a process for gluing together two members, in which at least one member is permeable to ultraviolet radiation, using a solvent-free photopolymerisable substance deposited in layer from between the two members and exposed via said permeable member to ultraviolet radiation, wherein the photopolymerisable substance is composed of a mixture of at least three groups of components, namely (i) a first group containing at least one vinyl monomer having a functionality equal to or above 2 and a molecular weight below 500 grams, (ii) a second group containing at least one reactive polymer soluble in the monomer of (i), and (iii) a third group containing at least one photosensitive catalyst, whose proportion compared with the total weight of the composition, is between 1 and 5%, provided that at least one of the first and second groups has a component with a thi-irane cycle in its structure.

BRIEF DESCRIPTION OF THE DRAWING

The FIGURE is an enlarged elevated perspective view of two shaped sheets joined together by procedure of the present invention.

DETAILED DESCRIPTION OF THE PREFERRED EMBODIMENTS

The invention will be better understood and other features will become more apparent from the following description relative to two non-limitative embodiments of the invention and with reference to the attached drawing.

The photopolymerisable composition according to the invention comprises (i) a monomer or a mixture of monomers, (ii) a polymer or a mixture of reactive polymers, i.e. polymerisable under the action of radiation and (iii) a photosensitive catalyst. When this mixture is exposed to ultraviolet radiation, the molecules constituting the catalyst are excited. They can then be decomposed and generate radicals, which initiate a polymerisation reaction of the monomers and reactive polymers, this reaction then spreading itself. According to a different process, the excited molecules of the catalyst can transfer their excitation energy to the monomers, which, in turn, release radicals initiating the polymerisation reaction. Polymerisation can also be initiated by the presence of a donor of hydrogen atoms which combines with the molecules of the excited catalyst and free a radical from the donor. The choice of the components of the mixture used for gluing the two surfaces together is guided by a fluidity requirement, in addition to the requirement of the presence of units which can be polymerised by the applied ultraviolet radiation. Thus, the composition must be spreadable onto one of the surfaces to be joined, but no solvent is permitted. The choice is therefore directed towards substances having a relatively low molecular weight.

According to the invention, the composition used comprises at least the following components:

A vinyl monomer or a mixture of vinyl monomers of low molecular weight, generally below 500 grams, said monomers being difunctional and/or polyfunctional (the functionality designating the number of vinyl unsaturations per molecule multiplied by 2).

A reactive polymer or a mixture of reactive polymers, whose chemical formula has at least one double bond or a cycle. These polymers must be soluble in the monomer or mixture of monomers in such a way that the composition formed is fluid. The respective proportions of monomers and reactive polymers can vary widely and are chosen as a function of the desired fluidity.

A photosensitive catalyst, generally an aromatic carbonyl compound, particularly benzoin and its derivatives which can liberate radicals under the action of ultraviolet radiation and benzophenone and its derivatives which can extract hydrogen atoms from donor compounds, which then become radicals able to initiate polymerisation. The catalyst proportion compared with the total weight of the composition is between 1 and 5%.

The hardening of the compositions by polymerisation is made rapid and complete by the fact that the chemical formula of at least one of the monomers or reactive polymers contains a thi-irane cycle, i.e. a cycle with three atoms, namely two carbon atoms and a sulphur atom.

The attached drawing shows two sheets 1, 2 of appropriate corresponding shapes, joined together by means of a photosensitive layer 3, whose composition is described above. Sheet 2 is made from a material permeable to a certain proportion of ultraviolet radiation to which it is exposed.

When the two sheets to be joined are of the same type of material, their adhesion is performed as follows. One face of one of the sheets 1 is covered with the layer 3 of the composition described herein by a known procedure, e.g. by means of a roller or by centrifuging. The second sheet, whose shape is adapted to correspond with that of the first, is applied to and contacted with the layer 3 in such a way that no air bubbles are left. The entire surface of the second sheet is exposed to ultraviolet radiation coming, for example, from a medium pressure mercury vapour tube (0.5 to 5 atmospheres), whose maximum emission is centered on the wavelength 365 mm. Radiation exposure is continued until complete hardening takes place. Its duration is determined beforehand, as a function of the power of the lamp used, the distance between the lamp and the exposed sheet, the thickness and ultraviolet absorption coefficient of the sheet exposed, the thickness of the photopolymerisable layer and its composition and in particular the characteristics of the catalyst.

Two sheets of different types can be glued together by the same method and one may optionally include a pretreatment step when the adhesive powers of the two sheets to the photopolymerisable layer differ. This preliminary step of coating one of the sheets (the less adhesive sheet) with a coupling agent or coating both of the sheets with two different coupling agents, the latter being compatible both with the photopolymerisable composition and with the coated sheet. These coupling crosslinking agents are generally silanes and they make it possible to increase the adhesion and consequently the effectiveness of gluing. After application of the coupling agent(s), drying is necessary before carrying out the following operations. Its duration is of the order of 20 min. in ambient atmosphere. The photopolymerisable layer is exposed to ultraviolet radiation, preferably through the sheet which absorbs less radiation.

After experimenting, it has been possible to determine classes of products which enter into the photopolymerisable composition and thus are particularly suitable for the performance of the process described. A non-exhaustive list is given hereinafter.

EXAMPLES OF VINYL MONOMERS

Suitable monomers are monoesters, diesters, triesters, and tetraesters of acrylic or methacrylic acid, acrylates being preferable to methacrylates because they are more reactive.

Among the monomers having a thi-irane cycle there may be mentioned thioglycidyl acrylate.

Among the other monomers there are alkyl acrylates, alkoxyalkyl acrylates, phenyl acrylates, glycidyl acrylates, alkanediol acrylates, alkylene glycol diacrylates, trimethylol propane triacrylate, pentaerythritol triacrylate and tetraacrylate.

EXAMPLES OF REACTIVE POLYMERS

They are also esters of acrylic or methacrylic acid, preferably acrylic acid.

Among the polymers having a thi-irane cycle there is thioglycidyl polyacrylate.

Among the polymers having no thi-irane there are polyethylene glycol diacrylate and polypropylene glycol diacrylate, glycidyl polyacrylate, optionally esterified either completely or partly by acrylic or methacrylic acid.

EXAMPLES OF PHOTOSENSITIVE CATALYSTS

Benzoin or one of its derivatives, or benzophenone or one of its derivatives may be used.

The composition described is intended more particularly for gluing sheets of glass or plastic belonging to one of the following groups: polyacrylics, particularly polymethyl methacrylate and; its copolymers polyvinyls, particularly polyvinyl chloride, polyvinyl acetate and their copolymers polycarbonate, polyesters, polystyrenes, celluloses, particularly cellulose triacetate and cellulose acetobutyrate.

Two embodiments of the process are described hereinafter. The first is applicable to the gluing together of two glass sheets. It can be used more particularly in the manufacture of laminated or safety glass windshields. The sheets of glass are either flat or are preshaped from the same mould. The latter applies to the gluing of a glass sheet and a plastic sheet belonging to one of the groups indicated hereinbefore. It can also be used in the manufacture of shields or casings, e.g. for helicopters, whose strength must be greater than that required for windshields.

According to the first embodiment, a previously cleaned sheet of glass is coated with a photopolymerisable composition constituted by 49.5% by weight of thioglycidyl polyacrylate (thi-irane cycle polymer) 7.5% by weight of pentaerythritol polyacrylate (hexafunctional monomer) 38% hexanediol diacrylate (difunctional monomer) and 5% benzoin dimethyl ether. After coating a second glass sheet of thickness 3 mm is applied and the assembly is irradiated through the latter by means of an average pressure mercury vapour tube with an electrical power of 1.9 kW. The distance between the lamp and the irradiated sheet is only 55 cm, so that hardening is obtained within a few seconds.

According to the second embodiment, a 3 mm thick glass sheet is coated with γ-methacryloxypropyl-trimethoxysilane which is a glass-acrylic composition adhesion promotor. After drying for 20 min. the second sheet to be joined, which is made of polyvinyl chloride, is coated with the same photopolymerisable composition as in the previous example, the glass sheet is applied by the top, its face is treated towards the inside and irradiation is carried out under the same conditions as those of the previous example. The two sheets are firmly adhered together after 30 seconds of irradiation.

Obviously, the present invention is not limited to the gluing of two transparent sheets. The process of the invention is also applicable to the gluing of two members having a random shape, whose two faces of matched shapes must be joined toegether. One of the members need not be transparent or strongly absorb ultraviolet radiation. In this case, radiation exposure permitting the hardening of the photopolymerisable composition takes place through the transparent member or through that member which absorbs least ultraviolet radiation in order to minimise the energy required.

What is claimed is:

1. A process for gluing together two members, at least one of said members being permeable to ultraviolet radiation, said process comprising:
   (A) applying to at least one of said members a layer of a solvent-free photopolymerizable composition that is photopolymerized by the exposure of ultraviolet radiation thereto, said composition comprising a mixture of:
      (1) at least one vinyl monomer having a functionality of at least 2 and a molecular weight less than 500 grams;
      (2) at least one reactive polymer that is soluble in said monomer (1); and
      (3) at least one photosensitive catalyst present in an amount of from 1 to 5 weight percent of said composition provided that at least one of said monomer (1) or polymer (2) have a ti-irane

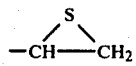

ring in its structure;
   (B) joining the two members together with the applied layer of photopolymerizable composition therebetween; and
   (C) exposing the thus joined members throught the at least one permeable number to ultraviolet radiation in an amount sufficient to photopolymerize said composition and joint the two members together.

2. A process according to claim 1 including the additional step, prior to step (A), of applying a coupling agent to at least one of said members to be joined.

3. A process according to claim 2 wherein said coupling agent is a silane.

4. A process according to claim 1, wherein the components of group (1) are monoesters, diesters, triesters and tetraesters of acrylic acid.

5. A process according to claim 2, wherein one of the components of the group is thioglycidyl acrylate.

6. A process according to claim 2, wherein one of the components of the group is ethyl acrylate.

7. A process according to claim 2, wherein one of the components of the group is pentaerythritol triacrylate.

8. A process according to claim 1, wherein one of the components of group (1) is a thioglycidyl polyacrylate.

9. A process according to claim 1, wherein the photosensitive catalyst (3) is benzoin or its derivatives.

10. A process according to claim 1, wherein the photosensitive catalyst (3) is benzophenone or its derivatives.

11. The article produced by the process of claim 1.

12. An article of manufacture having at least two members, one of them being permeable to ultraviolet radiation and at least one intermediate layer permitting the gluing together of the two respective faces of said members, the layer consisting of a photopolymerisable substance formed from a mixture of at least three groups of components, namely a first group containing at least one vinyl monomer of functionality equal to or above 2 and of molecular weight below 500 grams, a second group containing at least one reactive polymer soluble in the monomer, a third group containing at least one photosensitive catalyst, whose proportion is between 1 and 5% compared with the total weight and wherein at least one of the first and second groups comprises a component having a thi-irane cycle.

13. An article of manufacture according to claim 11, wherein the two members are sheets of glass.

14. An article of manufacture according to claim 11, wherein one of the members is a sheet of glass and the other is a sheet of plastic belonging to one of the groups polyacrylics, polyvinyls, polycarbonates, polyesters, polystyrenes and celluloses.

15. An article of manufacture according to claim 13, wherein a layer of a coupler agent is also inserted between the glass sheet and the intermediate layer.

* * * * *